(12) United States Patent
Cree

(10) Patent No.: US 12,516,186 B2
(45) Date of Patent: Jan. 6, 2026

(54) OIL-EXTENDED EPDM IN MOISTURE CURE BLEND

(71) Applicant: Dow Global Technologies LLC, Midland, MI (US)

(72) Inventor: Stephen H. Cree, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 771 days.

(21) Appl. No.: 17/790,223

(22) PCT Filed: Dec. 28, 2020

(86) PCT No.: PCT/US2020/067112
§ 371 (c)(1),
(2) Date: Jun. 30, 2022

(87) PCT Pub. No.: WO2021/138235
PCT Pub. Date: Jul. 8, 2021

(65) Prior Publication Data
US 2023/0091053 A1    Mar. 23, 2023

Related U.S. Application Data

(60) Provisional application No. 62/954,761, filed on Dec. 30, 2019.

(51) Int. Cl.
| | |
|---|---|
| C08L 23/0892 | (2025.01) |
| C08F 210/02 | (2006.01) |
| C08F 210/18 | (2006.01) |
| C08F 230/08 | (2006.01) |
| C08F 236/20 | (2006.01) |
| C08F 255/02 | (2006.01) |
| C08J 3/22 | (2006.01) |
| C08L 23/16 | (2006.01) |
| C08L 51/06 | (2006.01) |
| C09D 123/08 | (2006.01) |
| H01B 3/28 | (2006.01) |
| H01B 3/44 | (2006.01) |

(52) U.S. Cl.
CPC ........ *C08L 23/0892* (2013.01); *C08F 210/02* (2013.01); *C08F 210/18* (2013.01); *C08F 230/085* (2020.02); *C08F 236/20* (2013.01); *C08F 255/02* (2013.01); *C08J 3/226* (2013.01); *C08L 23/16* (2013.01); *C08L 51/06* (2013.01); *C09D 123/0892* (2013.01); *H01B 3/28* (2013.01); *H01B 3/441* (2013.01); *H01B 3/448* (2013.01); *C08J 2351/06* (2013.01); *C08L 2207/53* (2013.01); *C08L 2310/00* (2013.01)

(58) Field of Classification Search
CPC .... C08F 210/02; C08F 210/18; C08F 255/02; C08F 230/085; C08F 236/20; C08J 3/226; C08J 2351/06; C08L 23/0892; C08L 51/06; C08L 23/16; C08L 2207/53; C08L 2310/00; C09D 123/0892; H01B 3/28; H01B 3/441; H01B 3/448
See application file for complete search history.

(56) References Cited

U.S. PATENT DOCUMENTS

| | | |
|---|---|---|
| 4,088,714 A | 5/1978 | Huff |
| 4,618,654 A | 10/1986 | Schmidtchen et al. |
| 4,722,961 A | 2/1988 | Topcik |
| 4,798,864 A | 1/1989 | Topcik |
| 5,064,802 A | 11/1991 | Stevens et al. |
| 5,266,627 A | 11/1993 | Meverden et al. |
| 5,272,236 A | 12/1993 | Lai et al. |
| 5,278,272 A | 1/1994 | Lai et al. |
| 5,374,696 A | 12/1994 | Rosen et al. |
| 5,492,760 A | 2/1996 | Sarma et al. |
| 5,494,874 A | 2/1996 | Rosen et al. |
| 5,532,394 A | 7/1996 | Rosen et al. |
| 5,556,928 A | 9/1996 | Devore et al. |
| 5,624,878 A | 4/1997 | Devore et al. |
| 5,723,398 A | 3/1998 | Rosen et al. |
| 5,986,028 A | 11/1999 | Lai et al. |
| 8,445,786 B2 | 5/2013 | Cree et al. |
| 11,292,902 B2 | 4/2022 | Kato et al. |
| 2005/0049343 A1 | 3/2005 | Borke et al. |
| 2007/0027250 A1 | 2/2007 | Joseph et al. |
| 2017/0011817 A1 | 1/2017 | Uematsu et al. |
| 2017/0133121 A1 | 5/2017 | Yu et al. |
| 2019/0180890 A1 | 6/2019 | Yu et al. |
| 2019/0309117 A1 | 10/2019 | Zhang et al. |

FOREIGN PATENT DOCUMENTS

| | | |
|---|---|---|
| DE | 2856369 A1 | 7/1980 |
| DE | 3914283 A1 | 4/1990 |

(Continued)

OTHER PUBLICATIONS

Odian, G., Principles of Polymerization, Third Edition, John Wiley & Sons, Inc., 1991, pp. 19-24.*

(Continued)

*Primary Examiner* — Patrick D Niland
(74) *Attorney, Agent, or Firm* — Boyle Fredrickson S.C.

(57) ABSTRACT

The present disclosure provides a composition. The composition is crosslinkable and includes an ethylene silane-copolymer, an oil-extended ethylene-propylene-diene monomer (EPDM), and a crosslink catalyst. The present disclosure also provides the composition after crosslinking. In an embodiment, a crosslinked composition is provided and includes from 55 wt % to 85 wt % of an ethylene-silane copolymer and from 15 wt % to 45 wt % of an oil-extended EPDM. The crosslinked composition has: (a) a flexural modulus of 50 MPa to 160 MPa; and (b) a hot set elongation greater than 10%. The crosslinked composition can be used as a coating for a coated conductor.

5 Claims, No Drawings

(56) References Cited

FOREIGN PATENT DOCUMENTS

| | | | |
|---|---|---|---|
| EP | 0256246 | A2 | 2/1988 |
| EP | 0325573 | A2 | 7/1992 |
| GB | 1535251 | A * 12/1978 | ......... B29C 47/0004 |
| GB | 2156825 | A | 10/1985 |
| JP | 2019-131796 | A | 8/2019 |
| WO | 95/14024 | A | 5/1995 |
| WO | 98/49212 | A1 | 11/1998 |
| WO | 2009/002653 | A1 | 12/2008 |
| WO | WO-2014206952 | A1 * 12/2014 | ............... C08K 3/04 |

OTHER PUBLICATIONS

Achintya Kumar Sen et al., "Kinetics of silane grafting and moisture crosslinking of polyethylene and ethylene propylene rubber," Journal of Applied Polymer Science, Mar. 5, 1992, pp. 1153-1164, vol. 44, No. 7.

Li Zhongming et al., "Properties of crosslinkable silane grafted polyethylene blends," Journal of Materials Research, Jun. 30, 2022, pp. 301-306, vol. 15, No. 3.

* cited by examiner

OIL-EXTENDED EPDM IN MOISTURE CURE BLEND

BACKGROUND

The present disclosure relates to blends of oil-extended ethylene-propylene-diene monomer (EPDMs) and ethylene-silane copolymers.

The majority of polyethylene insulated low voltage cables are cured or crosslinked by a moisture cure process whereby an alkoxy silane attached to the polyethylene chain is hydrolyzed and then cures under the influence of a suitable catalyst. The alkoxy silane may be attached to the polyethylene chain by two methods. Either vinyl trialkoxy silane is copolymerized with ethylene to yield a silane copolymer or the vinyl alkoxy silane is grafted onto the polyethylene, polymer backbone by peroxide initiated reactive extrusion.

In the former case, the resulting copolymer is similar to low-density polyethylene (LDPE) and is a semi-rigid insulation material (flexural modulus of about 200 MPa). In the second case, more flexible resin systems can be produced by blending in an elastomer with the polyethylene during a reactive extrusion step. However, special extrusion equipment (e.g., silane dosing equipment, designed barrier screw, etc.) is needed to carry out the radical grafting process successfully. Additionally, elastomers that degrade or scission in the presence of peroxide or other free-radical sources cannot be used. Moreover, existing moisture-cured resins tend to become increasingly rigid or stiff at low temperatures, such as temperatures that can be encountered in outdoor use during the winter.

The art recognizes the need for a crosslinked ethylene-silane copolymer composition that exhibits improved flexibility, which still meets tensile, elongation, and cure state target properties for insulation on conductors and insulation for low-voltage cables in particular.

SUMMARY

The present disclosure provides a composition. The composition comprises an ethylene silane-copolymer, an oil-extended ethylene-propylene-diene monomer (EPDM), and a crosslink catalyst.

The present disclosure also provides the composition after crosslinking. In an embodiment, a crosslinked composition is provided and includes from 55 wt % to 85 wt % of an ethylene-silane copolymer and from 15 wt % to 45 wt % of an oil-extended EPDM. The crosslinked composition has: (a) a flexural modulus of 50 Mpa to 160 MPa; and (b) a hot set elongation greater than 10%.

The present disclosure also provides a coated conductor. The coated conductor comprises a conductor and a coating on the conductor, the coating comprising a crosslinked composition that includes (i) an ethylene-silane copolymer and (ii) an oil-extended ethylene-propylene-diene monomer (EPDM).

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), and subrange between any two explicitly values is included (e.g., the range 1-7 shown above includes subranges of from 1 to 2; from 2 to 6; from 5 to 7; from 3 to 7; from 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalentaryloxyether, phosphinimine, and others. Combinations of heterogeneous and/or homogeneous catalysts also may be used in either single reactor or dual reactor configurations.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

An "olefin-based polymer" or "polyolefin" is a polymer that contains more than 50 weight percent polymerized olefin monomer (based on total amount of polymerizable monomers), and optionally, may contain at least one comonomer. A nonlimiting example of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

The term "phr" or "parts per hundred," as used herein, is in reference to weight of a compositional component relative to hundred parts of a polymer. The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

A "conductor" is an element of elongated shape (wire, cable, optical fiber) for transferring energy at any voltage (DC, AC, or transient). The conductor is typically at least one metal wire or at least one metal cable (such as aluminum or copper), but may be optical fiber. The conductor may be a single cable or a plurality of cables bound together (i.e., a cable core, or a core).

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will effectuate substantial crosslinking upon subjection or exposure to such treatment (e.g., exposure to water).

"Cured" and like terms means that the polymer, before or after it is shaped into an article, was subjected or exposed to a treatment which induced crosslinking.

"Moisture curable" and like terms indicate that the composition will cure, i.e., crosslink, upon exposure to water. Moisture cure can be with or without the assistance of a crosslinking catalyst (e.g., a silanol condensation catalyst), promoter, etc.

A "wire" is a single strand of conductive metal, e.g., copper or aluminum.

Test Methods

Shore D is determined at 23° C. in accordance with DIN 53505, on specimens of 2 mm thickness, and the average of three measurements is recorded. Flexural modulus is measured in accordance with ISO 178 and a test speed of 1 mm/min. The result is recorded in megaPascal, or MPa.

The present compositions can be characterized by their tensile strength at break (in MPa) and elongation at break (%). Tensile strength and elongation are measured in accordance with the ISO 527 testing procedure on compression molded samples. Compression molded plates are pressed and cured under pressure on a Burkle press LA 63 at 180° C. for 10 minutes under a pressure of 120 Bar. Plates are then cooled to room temperature under fast cool conditions. 5 A dog-bone samples of 2 mm thickness are used and tested at 25 mm/min. Elongation at break, or elongation to break, is the strain on a sample when it breaks, expressed as a percent of the original sample length.

Hot Set is a measure of the degree of crosslinking. Testing is based on IEC 60811-507 method for power cable insulation materials. Hot set testing is conducted on 2 mm thick samples in an oven with a glass door at 200° C. with a force of 0.2 MPa stress applied to the bottom of the specimens. Three test specimens for each sample are cut using 5 A dog-bone samples. The samples are elongated for 15 minutes where the percentage increases in length are measured and the average values of the three specimens are reported as "hot set".

Mooney viscosity is measured as ML(1+4)125° C. in accordance with ASTM D1646. ML refers to Mooney Large Rotor. The viscometer is a Monsanto MV2000 instrument.

The number average molecular weight (Mn) is defined as number average molecular weight of polymer. The moments of the molecular weight distribution, $M_n$ (number-average molecular weight), $M_w$ (weight-average molecular weight) and $M_z$ (z-average molecular weight) are computed from the data as follows, where $W_i$ is weight fraction of species with molecular weight $M_i$:

$$M_n = \frac{\sum_i W_i}{\sum_i (W_i/M_i)}$$

$$M_w = \frac{\sum_i W_i \cdot M_i}{\sum_i W_i}$$

$$M_z = \frac{\sum_i W_i \cdot M_i^2}{\sum_i W_i \cdot M_i}$$

GPC molecular weight determination is measured using Waters alliance GPCV 2000 instrument. The columns used are 3× mixed bed 10 μm pl-gel. The injection volume is 200 μm of 0.14 wt % solution. The pump is set at a temperature of 55° C. and the columns and detectors at a temperature of 140° C.

DETAILED DESCRIPTION

The present disclosure provides a composition. The composition contains (i) an ethylene-silane copolymer, (ii) an oil-extended ethylene-propylene-diene monomer (EPDM), and (iii) a crosslink catalyst.

(i) Ethylene-Silane Copolymer

The present composition includes an ethylene-silane copolymer. The ethylene-silane copolymer is a reactor ethylene-silane copolymer or a silane grafted ethylene copolymer.

In an embodiment, the ethylene-silane copolymer is a reactor ethylene-silane copolymer. The reactor ethylene-silane copolymer is composed of an ethylene monomer and an alkoxysilane comonomer, and optionally one or more other copolymerizable monomers (such as vinyl acetate, ethyl acrylate, etc.) copolymerized in a polymerization reactor. The polymerization reactor used to produce the reactor ethylene-silane copolymer can be a high-pressure reactor. The term "high-pressure reactor," as used herein, is a polymerization reactor operated at a pressure of at least 34.47 megaPascal (mPa) (5000 pounds per square inch (psi)).

The term "alkoxysilane" or "alkoxysilane monomer," as used herein, is an alkoxysilane that will graft to the ethylene copolymer or compolymerize with ethylene monomer. The alkoxysilane or alkoxysilane monomer has a structure described by the following formula

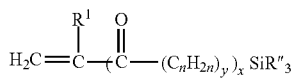

wherein $R^1$ is a hydrogen atom or methyl group;
x and y are 0 or 1 with the proviso that when x is 1, y is 1;
n is an integer from 1 to 12, and
each R" independently is a hydrolyzable organic group.

In an embodiment, each R" independently is an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), an amino or substituted amino group (e.g., alkylamino, arylamino), or a lower alkyl group having 1 to 6 carbon atoms, wherein not more than one of the three R" groups is an alkyl group.

In an embodiment, the alkoxysilane is an unsaturated silane having an ethylenically unsaturated hydrocarbyl group, (such as a vinyl, allyl, isopropenyl, butenyl, cyclohexenyl or gamma-(meth)acryloxy allyl group), and a hydrolyzable group, (such as, for example, a hydrocarbyloxy, hydrocarbonyloxy, or hydrocarbylamino group). Nonlimiting examples of hydrolyzable groups include methoxy, ethoxy, formyloxy, acetoxy, proprionyloxy, alkyl and arylamino groups. In a further embodiment, the alkoxysilane and its method of preparation is described in U.S. Pat. No. 5,266,627 to Meverden, et al.

In an embodiment, the alkoxysilane is selected from vinyl trimethoxy silane (VTMS), vinyl triethoxy silane, vinyl triacetoxy silane, gamma-(meth)acryloxy propyl trimethoxy silane or a combination thereof.

In an embodiment, the alkoxysilane is vinyl trimethoxy silane (VTMS) and/or vinyl triethoxy silane (VTES).

The alkoxysilane may comprise two or more embodiments disclosed herein.

In an embodiment, the ethylene-silane copolymer is a reactor ethylene-silane copolymer comprising units derived from ethylene monomer and an alkoxysilane monomer. The ethylene-silane copolymer consists of units derived from ethylene monomer and the alkoxysilane monomer as the only monomers. Alternatively, the ethylene-silane copolymer additionally comprises units derived from one or more monomers other than ethylene monomer and the alkoxysilane monomer.

In an embodiment, the ethylene-silane copolymer is void of, or otherwise excludes, units derived from a styrenic monomer (e.g., styrene, methyl styrene).

Non-limiting examples of suitable reactor ethylene-silane copolymers include SI-LINK™ DFDA-5451 NT and SI-LINK™ AC DFDB-5451 NT, each available from The Dow Chemical Company, Midland, Michigan.

In an embodiment, the ethylene-silane copolymer is a silane-grafted ethylene copolymer. The term "silane-grafted-ethylene copolymer," as used herein, refers to an alkylsiloxy ethylene copolymer made by post-reactor grafting of an alkoxysilane to an ethylene homopolymer or copolymer. In an embodiment, the alkoxysilane is grafted to an ethylene copolymer in the presence of a free radical initiator.

The ethylene copolymer of the silane-grafted-ethylene copolymer is produced using conventional polyethylene polymerization technology, e.g., high-pressure, Ziegler-Natta, metallocene or constrained geometry catalysis. In an embodiment, the polyethylene is made in a high pressure reactor. In a further embodiment, the polyethylene is made using a mono- or bis-cyclopentadienyl, indenyl, or fluorenyl transition metal catalyst or a constrained geometry catalyst in combination with an activator, in a solution, slurry, or gas phase polymerization process. U.S. Pat. No. 5,064,802, WO93/19104 and WO95/00526 disclose constrained geometry metal complexes and methods for their preparation. WO95/14024 and WO98/49212 disclose substituted indenyl containing metal complexes and methods for their preparation.

In an embodiment, the ethylene copolymer is the product of post-reactor modification, such as reactive extrusion to make a graft copolymer.

In an embodiment, the ethylene copolymer can be branched, linear, or substantially linear. The term "branched ethylene copolymer," as used herein, is an ethylene copolymer prepared in a high-pressure reactor having a highly branched polymer structure, with branches found both on the polymer backbones and on the branches themselves. The term "substantially linear ethylene copolymer," as used herein, is an ethylene copolymer having a backbone that is substituted with 0.01 to 3 long-chain branches per 1,000 carbon atoms. In an embodiment, the ethylene copolymer can have a backbone that is substituted with 0.01 to 1 long-chain branches per 1,000 carbon atoms, or from 0.05 to 1 long-chain branches per 1,000 carbon atoms. Nonlimiting examples of suitable linear ethylene copolymers are described in U.S. Pat. Nos. 5,272,236, 5,278,272 and 5,986,028.

In an embodiment, the ethylene copolymer is a homopolymer, an interpolymer, a random or block copolymer, a functionalized polymer (e.g., ethylene vinyl acetate, ethylene ethyl acrylate, etc.) or a nonfunctionalized polymer. In a further embodiment, the ethylene interpolymer is an elastomer, a flexomer, or a plastomer.

In an embodiment, the ethylene copolymer is an ethylene/α-olefin copolymer. The α-olefin includes $C_3$-$C_{20}$ linear, branched or cyclic α-olefin, or a $C_4$-$C_8$ linear α-olefin. Nonlimiting examples of $C_3$-$C_{20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can have a cyclic structure such as cyclohexane or cyclopentane, resulting in an α-olefin such as 3-cyclohexyl-1-propene (allyl cyclohexane) and vinyl cyclohexane. Nonlimiting examples of $C_4$-$C_8$ linear α-olefin include 1-butene, 1-hexene, and 1-octene.

Nonlimiting examples of an ethylene copolymer include high density polyethylene (HDPE); medium density polyethylene (MDPE); linear low density polyethylene (LLDPE); low density polyethylene (LDPE); very low density polyethylene (VLDPE); homogeneously branched, linear ethylene/a-olefin copolymers (e.g., TAFMER™ by Mitsui Petrochemicals Company Limited and EXACT™ by DEX Plastomers); homogeneously branched, substantially linear ethylene/a-olefin polymers (e.g., AFFINITY™ polyolefin plastomers and ENGAGE™ polyolefin elastomers available from The Dow Chemical Company); and ethylene block copolymers (INFUSE™ also available from The Dow Chemical Company).

In an embodiment, the ethylene copolymer comprises units derived from ethylene in an amount from 50, or 60, or 80, or 85 to 90, or 95, or 97, or 99, or 99.5, or 100 weight percent (wt %). In a further embodiment, the ethylene copolymer comprises units derived from ethylene in an amount from 50 to 100 wt %, or from 60 to 99.5 wt %, or from 80 to 95 wt %.

In an embodiment, the ethylene copolymer is an ethylene/α-olefin interpolymer having an α-olefin content from 15, or 20, or 25, to 40, or 45, or 50 wt % based on the weight of the interpolymer. In a further embodiment, the ethylene polymer is an ethylene/α-olefin copolymer having a α-olefin content from 15 to 50 wt %, or from 20, to 45 wt % or from 25 to 40 wt % based on the weight of the copolymer. The α-olefin content may be determined by $^{13}C$ nuclear magnetic resonance (NMR) spectroscopy using the procedure described in Randall (Rev. Macromol. Chem. Phys., C29 (2&3)).

In an embodiment, the ethylene copolymer has a melt index (I2) from 0.1, or 0.5, or 1 to 2, or 5, or 10, or 20, or 30, or 50 g/10 min. In a further embodiment, the ethylene copolymer has a melt index (I2) from 0.1 to 50 g/10 min, or from 0.5 to 30 g/10 min, or from 1 to 5 g/10 min.

In an embodiment, the ethylene copolymer is void of, or otherwise excludes, a styrenic polymer (e.g., styrene, methyl styrene).

The ethylene copolymer may comprise two or more embodiments disclosed herein.

In an embodiment, the ethylene-silane copolymer is present in an amount from 55 wt %, or 60 wt %, or 70 wt % to 80 wt %, or 90 wt %, based on the total weight of the disclosed composition.

The ethylene-silane copolymer may comprise two or more embodiments disclosed herein.

(ii) Oil-Extended EPDM

The present composition includes an oil-extended ethylene-propylene-diene monomer (EPDM). An "ethylene-propylene-diene monomer" or "EPDM" includes units derived from ethylene. The EPDM also includes units derived from propylene. Olefin other than and/or in addition to propylene may be utilized in the EPDM. Nonlimiting examples of suitable olefins for mixture with ethylene include one or more $C_{4-30}$ or $C_{4-20}$ or $C_{4-12}$ or $C_{4-8}$ aliphatic-, cycloaliphatic- or aromatic-compounds (comonomers) containing one or more ethylenic unsaturations. Examples include aliphatic-, cycloaliphatic- and aromatic olefins such as isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, vinyl cyclohexane, styrene, cyclopentene, cyclohexene, cyclooctene, and mixtures.

In an embodiment, the EPDM includes units derived from a diene. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene; branched chain acyclic diene, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5 sopropylidene-2-norbornene, 5-(4-cyclopentenyl)-2-norbornene, 5-cyclohexylidene-2-norbornene, 5-vinyl-2-norbornene, norbornadiene, 1,4-hexadiene (HD), 5-ethylidene-2-norbornene (ENB), 5-vinylidene-2-norbornene (VNB), 5-methylene-2-norbornene (MNB), and dicyclopentadiene (DCPD).

In an embodiment, the diene is selected from VNB and ENB.

In an embodiment, the diene is ENB.

In an embodiment, the ethylene content of the EPDM is from 50 wt %, or 55 wt %, to 60 wt %, or 70 wt % of the total EPDM. In a further embodiment, the ethylene content of the EPDM is from 60 wt % to 70 wt %.

In an embodiment, the EPDM has a diene content from 0.1 wt %, or 0.5 wt %, or 1.0 wt %, or 2.0 wt %, or 3.0 wt %, or 4.0 wt %, to 4.5 wt %, or 5.0 wt %, or 5.5 wt %.

An "oil-extended EPDM" as used herein, is an EPDM product that contains an EPDM and at least 30 phr oil. The oil can be an aromatic oil, a mineral oil, a naphthenic oil, paraffinic oil, and a triglyceride-based vegetable oil such as castor oil, a synthetic hydrocarbon oil such as polypropylene oil, a silicone oil, or any combination thereof.

The oil content in the oil-extended EPDM is from 30 phr (30/130=23 wt %), or 40 phr (40/140=29 wt %), or 50 phr (50/150=33 wt %), or 60 phr (60/160=38 wt %), or 70 phr (70/170=41 wt %), to 80 phr (80/180=44 wt %), or 90 phr (90/190=47 wt %), or 100 phr (100/200=50 wt %).

In an embodiment, the oil-extended EPDM contains from 70 phr (41 wt %), or 80 phr (44 wt %) to 90 phr (47 wt %), or 100 phr (50 wt %) and has a Mooney viscosity ML (1+4) at 125° C. from 35, or 40 to 50, or 65.

In an embodiment, the oil-extended EPDM has a number-average molecular weight (Mn) from 150,000 to 250,000; a weight-average molecular weight (Mw) from 350,000 to 550,000; and a z-average molecular weight (Mz) from 500,000 to 1,500,000. In a further embodiment, the oil-extended EPDM has an Mz from 600,000 to 1,500,000.

Non-limiting examples of suitable oil-extended EPDMs include KEP 902N available from Kumho Polychem, XUS 51111 available from The Dow Chemical Company, and Keltan® 5469Q available from Arlanxeo.

In an embodiment, the oil-extended EPDM is present in an amount from 10 wt %, or 20 wt %, to 30 wt %, or 35 wt %, or 40 wt %, or 45 wt %, based on the total weight of the disclosed composition. In an embodiment, the oil-extended EPDM is present in an amount no more than 45 wt % based on the total weight of the disclosed composition.

In an embodiment, the oil-extended EPDM has one, some, or all of the following properties:
(a) an ethylene content from 50 wt %, or 55 wt %, to 60 wt %, or 70 wt %; and/or (b) a diene content from 0.1 wt %, or 0.5 wt %, or 1.0 wt %, or 2.0 wt %, or 3.0 wt %, or 4.0 wt %, to 4.5 wt %, or 5.0 wt %, or 5.5 wt %; and/or (c) an oil content from 70 phr, or 80 phr to 90 phr, or 100 phr and a Mooney viscosity ML (1+4) at 125° C. from 35, or 40 to 50, or 65; and/or (d) a number-average molecular weight (Mn) from 150,000 to 250,000; and/or (e) a weight-average molecular weight (Mw) from 350,000 to 550,000; and/or (f) a z-average molecular weight (Mz) from 600,000 to 1,500,000.

The oil-extended EPDM may comprise two or more embodiments disclosed herein.

(iii) Crosslink Catalyst

The ethylene-silane copolymer and oil-extended EPDM are combined with a crosslinking catalyst. A "crosslinking catalyst" is a catalyst capable of forming Si—O—Si linkages across the polymer chains of the ethylene-based polymer, thereby crosslinking the polymer.

The resulting composition containing an ethylene-silane copolymer and an oil-extended EPDM, of the present disclosure may be cured by contact with, or exposure to, water (moisture), in the presence of the crosslink catalyst (also called "moisture-cure" catalyst herein). Suitable catalysts include metal carboxylates, such as dibutyltin dilaurate, stannous octoate, stannous acetate, dibutyl dimethoxy tin, dibutyltin bis(2,4 pentanedionate), lead naphthalate and zinc octoate; organic metal compounds, such as titanium esters and chelates such as tetrabutyl titanate; organic bases, such as ethylamine, hexylamine and piperidine; and acids, such as mineral acids and fatty acids. Ambient or accelerated cure systems typically use fast acting condensation catalysts, such as aromatic sulphonic acids. Such moisture-cure crosslinking catalysts and catalyst systems are readily commercially available. Examples of suitable commercial catalysts in masterbatch form include, without limitation, DFDB 5480NT (a tin catalyst system), DFDA 5488NT (a fast ambient cure catalyst masterbatch) from DOW Plastics, or the Borealis AMBICAT™ system LE 4476.

In an embodiment, the crosslink catalyst masterbatch is present in an amount from 0.5 wt %, or 1.0 wt %, or 2.0 wt %, or 3.0 wt %, or 4.0 wt % to 5.0 wt %, or 6.0 wt %, or 8 wt %, or 10 wt %, based on the total weight of the present composition. In an embodiment, the crosslink catalyst masterbatch has an amount from 0.5 wt %, or 1.0 wt %, or 1.5 wt %, to 2.0 wt %, or 2.5 wt %, or 3.0 wt % of active catalyst based on the weight of the crosslink catalyst masterbach. In an embodiment, the active catalyst is present in an amount from 0.01 wt %, or 0.05 wt %, or 0.06 wt % to 0.07 wt %, or 0.09 wt %, or 0.10 wt %, or 0.15 wt %, or 0.2 wt % based on the total weight of the present composition.

(iv) Moisture Curing

In an embodiment, the disclosed composition is moisture cured. Prior to moisture curing, the ethylene-silane copolymer is blended with the oil-extended EPDM and a crosslink catalyst.

In an embodiment, crosslinking is delayed until the composition is cured by exposure to moisture ("moisture curing").

In an embodiment, the moisture is water. In an embodiment, the moisture curing is conducted by exposing the coated conductor to water in the form of humidity (e.g., water in the gaseous state) or submerging the coated conductor in a water bath. Relative humidity can be as high as 100%.

In an embodiment, the moisture curing takes place at a temperature from room temperature (ambient conditions) up to 100° C. for a duration from 1 hour, or 4 hours, or 12 hours, or 24 hours, or 2 days, or 3 days, or 5 days to 6 days, or 8 day, or 10 days, or 12 days, or 14 days, or 28 days, or 60 days.

In an embodiment, the ethylene-silane copolymer is present in an amount from 55 wt %, or 60 wt %, or 70 wt %, to 85 wt %, or 90 wt %, based on the total weight of the crosslinked composition. In an embodiment, the oil-extended EPDM is present in an amount from 10 wt %, or 15 wt %, to 30 wt %, or 35 wt %, or 40 wt %, or 45 wt %, based on the total weight of the crosslinked composition.

In an embodiment, the EPDM of the oil-extended EPDM has a z-average molecular weight (Mz) from 600,000 to 1,500,000.

In an embodiment, the moisture curable composition includes, in an amount based on the total weight of the disclosed composition:

(i) from 55 wt %, or 60 wt %, or 70 wt %, to 85 wt %, or 90 wt %, of an ethylene-silane copolymer;

(ii) from 10 wt %, or 15 wt %, to 30 wt %, or 35 wt %, or 40 wt %, or 45 wt %, of an oil-extended EPDM; and (iii) from 0.5 wt %, or 1.0 wt %, or 2.0 wt %, or 3.0 wt %, or 4.0 wt % to 5.0 wt %, or 6.0 wt %, or 8 wt %, or 10 wt %, of a crosslink catalyst masterbatch, with an active catalyst content (based on total weight of the composition) from 0.01 wt %, or 0.05 wt % or 0.1 wt %, to 0.2 wt %, or 0.5 wt %, wherein components (i), (ii), and (iii) amount to 100 wt % of the moisture curable composition.

(v) Crosslinked Composition

In an embodiment, the disclosure provides a crosslinked composition comprising from 55 wt % to 85 wt % of ethylene-silane copolymer and from 15 wt % to 45 wt % of the oil-extended EPDM, the crosslinked composition having a flexural modulus from 50 MPa to 160 MPa and a hot set greater than 10%. The crosslinked composition is formed by way of the crosslinking catalyst and moisture cure as previously discussed above.

In an embodiment, the crosslinked composition has a Shore D hardness from 20, or 30, or 35, to 40, or 45, or 49.

In an embodiment, the crosslinked composition has a flexural modulus from 50 MPa, or 60 MPa, or 70 MPa, or 75 MPa, or 80 MPa, or 85 MPa, to 95 MPa, or 100 MPa, or 110 MPa, or 120 MPa, or 130 MPa, or 150 MPa, or 160 MPa.

In an embodiment, the crosslinked composition has a tensile strength from 7.0 MPa, or 8.0 MPa, or 9.0 MPa, or 10.0 MPa to 11.0 MPa, or 12.0 MPa, or 13.0 MPa, or 14.0 MPa, or 15.0 MPa.

In an embodiment, the crosslinked composition has a hot set performance greater than 10%, or from greater than 10% to 70%, or from 20% to 60%, or from 30% to 60%.

In an embodiment, the crosslinked composition comprises, in an amount based on the total weight of the crosslinked composition:

(i) from 55 wt %, or 65 wt %, or 70 wt %, or 75 wt % to 80 wt %, or 85 wt % of the ethylene-silane copolymer; and (ii) an amount of oil-extended EPDM from 15 wt %, or 20 wt %, to 25 wt %, or 30 wt %, or 35 wt %, or 40 wt %, or 45 wt %, or 50 wt % of the oil-extended EPDM; and the crosslinked composition has one, some, or all of the following properties:
 (a) a Shore D hardness from 20, or 30, or 35, to 40, or 45, or 49; and/or
 (b) a flex modulus from 50 MPa, or 60 MPa, or 70 MPa, or 75 MPa, or 80 MPa, or 85 MPa, to 95 MPa, or 100 MPa, or 110 MPa, or 120 MPa, or 130 MPa, or 150 MPa, or 160 MPa; and/or
 (c) a tensile strength from 7.0 MPa, or 8.0 MPa, or 9.0 MPa, or 10.0 MPa to 11.0 MPa, or 12.0 MPa, or 13.0 MPa, or 14.0 MPa, or 15.0 MPa; and/or
 (d) a hot set performance greater than 10%, or from greater than 10% to 70%, or from 20% to 60%, or from 30% to 60%.

In an embodiment, the crosslinked composition comprises, in an amount based on the total weight of the composition:
 (i) from 70 wt %, or 75 wt % to 80 wt % of the ethylene-silane copolymer, where the ethylene-silane copolymer optionally has a silane content from 0.1 wt %, or 0.3 wt %, or 0.5 wt % to 1.0 wt %, or 2.0 wt % silane; and
 (ii) an amount of oil-extended EPDM from 15 wt %, or 20 wt %, to 25 wt % of the oil-extended EPDM; and
the crosslinked composition has one, some, or all of the following properties:
 (a) a Shore D hardness from 30, or 35, to 40, or 45; and/or
 (b) a flex modulus 50 MPa, or 60 MPa, or 70 MPa, or 75 MPa, or 80 MPa, or 85 MPa, to 95 MPa, or 100 MPa, or 110 MPa, or 120 MPa, or 130 MPa, or 150 MPa, or 160 MPa; and/or
 (c) a tensile strength from 8.0 MPa, 9.0 MPa, or 10.0 MPa to 11.0 MPa, or 12.0 MPa, or 13.0 MPa, or 14.0 MPa, or 15.0 MPa; and/or
 (d) a hot set performance from 45%, or 50% to 55%, or 60%.

The crosslinked composition may comprise two or more embodiments disclosed herein.

The present compositions can be processed to fabricate articles. For example, the compositions can be processed to films or sheets or to one or more layers of a multi-layered structure by know processes, such as calendering, blowing, casting or (co-)extrusion processes. Injection molded, compression molded, extruded or blow molded parts can also be prepared from the compositions of the present disclosure. Alternatively, the compositions can be processed to foams or fibers or extruded into wire and cable coatings such as jacketing and insulation.

(vi) Coated Conductor

In an embodiment, the disclosure provides a coated conductor comprising a conductor and a coating on the conductor. The coating is a crosslinked composition composed of (i) ethylene-silane copolymer and (ii) and the oil-extended EPDM as previously disclosed herein.

The process for producing the coated conductor includes heating the crosslinkable composition containing the catalyst masterbatch to at least the melting temperature of the ethylene-silane copolymer and then extruding the polymer melt onto the conductor. The term "onto" includes direct contact or indirect contact between the melt blend and the conductor. The melt blend is in an extrudable state.

The coating is crosslinked. In an embodiment, crosslinking is delayed until the coating is crosslinked by exposure to moisture.

In an embodiment, the moisture curing is conducted as previously disclosed above.

In an embodiment, the ethylene-silane copolymer is present in an amount from 55 wt %, or 65 wt %, or 70 wt %, or 75 wt % to 80 wt %, or 85 wt %, based on the total weight of the coating and the oil-extended EPDM is present in an amount from 45 wt %, or 40 wt %, or 35 wt %, or 30 wt %, or 25 wt % to 20 wt %, or 15 wt %, based on the total weight of the coating.

The coating may be one or more inner layers. The coating wholly covers or otherwise surrounds or encases the conductor. The coating may be the sole component surrounding the conductor. Alternatively, the coating may be one layer of a multilayer insulation or jacket or sheath encasing the conductor. In an embodiment, the coating directly contacts the conductor. In another embodiment, the coating directly contacts an intermediate layer surrounding the conductor.

In an embodiment, the coating on the conductor has a Shore D hardness from 20, or 30, or 35, to 40, or 45, or 49.

In an embodiment, the coating on the conductor has a flexural modulus from 70 MPa, or 75 MPa, or 80 MPa, or 85 MPa, to 95 MPa, or 100 MPa, or 110 MPa, or 120 MPa or 130 MPa, or 150 MPa, or 160 MPa.

In an embodiment, the coating on the conductor has a tensile strength from 7.0 MPa, or 8.0 MPa, or 9.0 MPa, or 10.0 MPa to 11.0 MPa, or 12.0 MPa, or 13.0 MPa, or 14.0 MPa, or 15.0 MPa.

In an embodiment, the coating on the conductor has a hot set performance greater than 10%.

In an embodiment, the coating on the conductor has a hot set performance from greater than 10%, or from 10% to 70%, or from 20% to 60%, or from 30% to 60%.

In an embodiment, the coating on the conductor contains, consists essentially of, or consists solely of, the crosslinked composition, the crosslinked composition comprising, in an amount based on the total weight of the coating:
 (i) from 55 wt %, or 65 wt %, or 70 wt %, or 75 wt % to 80 wt %, or 85 wt % of the ethylene-silane copolymer; and
 (ii) from 45 wt %, or 40 wt %, or 35 wt %, or 30 wt %, or 25 wt % to 20 wt %, or 15 wt % of the oil-extended EPDM; and
the crosslinked composition has one, some, or all of the following properties:
 (a) a Shore D hardness from 20, or 30, or 35, to 40, or 45, or 49; and/or
 (b) a flex modulus from 70 MPa, or 75 MPa, or 80 MPa, or 85 MPa, to 95 MPa, or 100 MPa, or 110 MPa, or 120 MPa; and/or
 (c) a tensile strength from 7.0 MPa, or 8.0 MPa, or 9.0 MPa, or 10.0 MPa to 11.0 MPa, or 12.0 MPa, or 13.0 MPa, or 14.0 MPa, or 15.0 MPa; and/or
 (d) a hot set performance from 45%, or 50% to 55%, or 60%.

The coating can be a jacket or an insulation layer for the coated conductor. In an embodiment, the coating is a jacket, alternatively, the coating is an insulation layer.

The coated conductor may comprise two or more embodiments disclosed herein.

By way of example, and not limitation, some embodiments of the present disclosure will now be described in detail in the following Examples.

Examples

1. Materials

Materials used in examples are provided in Table 1 below.

TABLE 1

| Material/Description | Properties | Source |
| --- | --- | --- |
| Si-Link DFDB 5451 NT: reactor ethylene silane copolymer | Density = 0.922 g/cc, Tensile strength = 16.5 MPa, Tensile Elongation (Break) = 350%, Silane content = 1.5 wt % silane. | Dow Inc. |
| Experimental silane copolymer 1 | Density = 0.920 g/cc, Tensile strength = 18.3 MPa, Tensile Elongation (Break) = 435%, Silane content = 0.3 wt % silane, 12 (melt index at 190° C.) = 3.8 g/10 min. | Dow Inc. |
| KEP902N: oil-extended EPDM | Mooney Viscosity ML(1 + 8) at 125° C. = 52, Mooney Viscosity ML(1 + 4) at 125° C. = 61, Ethylene Content = 67 wt %, Diene content = 4.5 wt %, Oil content = 100 phr. | Kumho Polychem |
| XUS 51111: oil-extended EPDM | Mooney Viscosity ML(1 + 4) at 125° C. = 55, Ethylene Content = 65 wt %, Diene content = 4.9 wt %, Oil content = 75 phr. | Dow Inc. |
| Nordel IP 3722: EPDM | Mooney Viscosity ML(1 + 4) at 125° C. = 19, Ethylene Content = 71 wt %, Diene content = 0.5 wt %, Oil content = 0 phr. | Dow Inc. |
| Keltan 5469: oil-extended EPDM | Ethylene Content = 59 wt %, Diene content = 4 wt %, Oil content = 100 phr. Mooney Viscosity ML(1 + 8) at 150° C. = 38 (Mooney Viscosity ML(1 + 4) at 125° C. = 50). | Arlanxeo |
| DFDA 5488 NT: silanol condensation catalyst | Density = 0.930 g/cc. | Dow Inc. |
| DFDA 5480 NT: catalyst masterbatch containing polyolefin carrier | Density = 0.930 g/cc. | Dow Inc. |

TABLE 2

Properties of EPDMs

| | | EPDM | Oil-extended EPDM | | |
| --- | --- | --- | --- | --- | --- |
| Property | Units | Nordel IP 3722 | KEP 902 | XUS 51111 | Keltan 5469Q |
| Mooney Viscosity | ML (1 + 4) at 125° C. | 19 | 61 | 55 | 50 |
| | ML (1 + 8) at 125° C. | NA | 52 | NA | NA |
| | ML (1 + 8) 150° C. | NA | NA | NA | 38 |
| Diene Content | wt % | 0.5 | 4.5 | 4.9 | 4 |
| Ethylene Content | wt % | 71 | 67 | 65 | 59 |
| Oil Content | phr | 0 | 100 | 75 | 100 |
| Crystallinity | % | 15 | NA | 7 | NA |
| Mn | | 38,500 | 182,000 | 177,000 | 219,000 |
| Mw | | 114,000 | 540,000 | 377,000 | 530,000 |
| Mz | | NA | 1,298,000 | 684,000 | 1,102.40 |

NA = Not available.

2. Blend Composition of Ethylene-Silane Copolymer and Oil-Extended EPDM.

The procedure for obtaining a crosslinked blend composition of ethylene-silane copolymer and oil-extended EPDM begins by blending on a small internal mixer Si-Link DFDB 5451 NT, oil-extended EPDM (Table 2 shows the properties of the oil-extended EPDMs used), and the crosslinking catalyst masterbatch at 160° C. for 10 to 15 min to achieve a uniform mixture. Table 3 shows the formulations utilized in this Example. The resulting mixture is immediately pressed into a 2 mm plate. To achieve crosslinking, the plate is placed immediately in a waterbath at 60° C. with both plate sides exposed. Dog-bone samples are cut from this plate and the hot set performance is measured as a function of cure time in the waterbath. If the sample cannot hold the 0.2 MPa stress, a lower tensile stress of 0.1 MPa has been used to show crosslinked network formation. Final hot set elongation percentages are reported when the hot set elongation values no longer change as a function of waterbath cure time.

Table 3 shows the mechanical properties of the comparative samples (CS) and inventive examples (IE). The data shown on Table 3 indicates that the formulations of the IEs have lower hardness, lower flex modulus, have a good hot set performance (i.e., hot set of less than 175% elongation) and mechanical properties when compared to CS1 and CS2.

In addition to the above shown formulations, in IE4 Applicant also explored the use of an ethylene-silane copolymer containing a very low amount of silane (less than 0.5 wt % of Si). Table 3 shows the formulation and properties of IE4 example.

TABLE 3

Composition and Properties of Comparative Samples (CS) and Inventive Examples (IE).

|  | CS1 | CS2 | IE1 | IE2 | IE3 | IE4 | IE5 |
|---|---|---|---|---|---|---|---|
| DFDB-5451NT (wt %) | 95 | 76 | 76 | 76 | 76 | 0 | 76 |
| Experimental silane copolymer 1 (wt %) | 0 | 0 | 0 | 0 | 0 | 76 | 0 |
| KEP 902 (wt %) | 0 | 0 | 0 | 20 | 20 | 20 | 0 |
| XUS 51111 (wt %) | 0 | 0 | 20 | 0 | 0 | 0 | 0 |
| Keltan 5469Q (wt %) | 0 | 0 | 0 | 0 | 0 | 0 | 22 |
| Nordel IP 3722 (wt %) | 0 | 20 | 0 | 0 | 0 | 0 | 0 |
| DFDA-5488NT (wt %) | 5 | 4 | 4 | 4 | 0 | 4 | 0 |
| DFDA-5480NT (wt %) | 0 | 0 | 0 | 0 | 4 | 0 | 2 |
| PROPERTIES | | | | | | | |
| Shore D | 50 | 40 | 38 | 40 | 39 | 40 | 35 |
| Flex Modulus (MPa) | 190 | 150 | 85 | 80 | 110 | 98 | N/A |
| Tensile Strength (MPa) | 19 | 16.5 | 14.5 | 13 | 12.3 | 8.4 | 8.2 |
| Elongation @ Break (%) | 315 | 330 | 325 | 305 | 310 | 315 | 241 |
| Hot Set (%) | 25 | 40 | 45 | 50 | 45 | 60* | 46 |

*= 0.1 MPa versus normal 0.2 MPa.
N/A = not available.

The properties from IE1-IE5 show that adding the oil-extended EPDM increases flexibility and increases blend softness as demonstrated by the decrease in Shore D hardness, over the CS1 sample.

Applicant demonstrates that the incorporation of an oil-extended EPDM, at around 20 wt % of the composition, results in a crosslinked composition having lower hardness and lower flexural modulus, compared to CS1. The IEs are capable of forming a crosslinked network as demonstrated over the hot set performance, even when these IE compositions have a significant amount of an oil-extended EPDM.

IE 4, which contains an experimental reactor ethylene-silane copolymer with very low (0.3 wt % Si) silane content, shows that it too forms a crosslinked network and holds a hot set force at 200° C. This was unexpected as the silane content is very low, 0.3 wt % Si. As shown in Table 3, Inventive Example 4 did not hold the 0.2 MPa force but it held the lower 0.1 MPa force, showing that there still was network formation.

It is specifically intended that the present disclosure not be limited to the embodiments and illustrations contained herein, but include modified forms of those embodiments including portions of the embodiments and combinations of elements of different embodiments as come within the scope of the following claims.

I claim:

1. A crosslinked composition comprising:
   from 55 wt % to 85 wt % of an ethylene-silane copolymer;
   from 15 wt % to 45 wt % of an oil-extended EPDM;
   wherein the crosslinked composition has:
   (a) a flexural modulus from 50 MPa to 120 MPa;
   (b) a hot set elongation greater than 10%; and
   (c) a Shore D hardness from 30 to 45.

2. The crosslinked composition of claim 1 wherein the EPDM of the oil-extended EPDM has a Mw average molecular weight from 300,000 to 650,000.

3. The crosslinked composition of claim 2 wherein the crosslinked composition has a tensile strength from 5.0 MPa to 15.0 MPa.

4. A coated conductor comprising:
   a conductor; and
   a coating on the conductor, the coating comprising a crosslinked composition comprising
      (i) from 55 wt % to 85 wt % of an ethylene-silane copolymer; and
      (ii) from 45 wt % to 15 wt % of an oil-extended ethylene-propylene-diene monomer (EPDM); and
   the coated conductor has
   a Shore D hardness from 30 to 45, and
   a flexural modulus from 50 MPa to 120 MPa.

5. A coated conductor comprising:
   a conductor; and
   a coating on the conductor, the coating comprising a crosslinked composition comprising
      (i) from 55 wt % to 85 wt % of an ethylene-silane copolymer; and
      (ii) from 45 wt % to 15 wt % of an oil-extended ethylene-propylene-diene monomer (EPDM);
   wherein the coated conductor has the following properties:
   a) a tensile strength from 5.0 MPa to 15.0 MPa;
   b) a hot set elongation greater than 10%;
   c) a Shore D hardness from 30 to 45; and
   d) a flexural modulus from 50 MPa to 120 MPa.

* * * * *